Sept. 27, 1966   J. M. SZARKOWSKI   3,275,820
ILLUMINATING SYSTEM
Filed Dec. 26, 1963   2 Sheets-Sheet 1

INVENTOR
JOSEPH M. SZARKOWSKI
BY
Williamson & Palmatier
ATTORNEYS

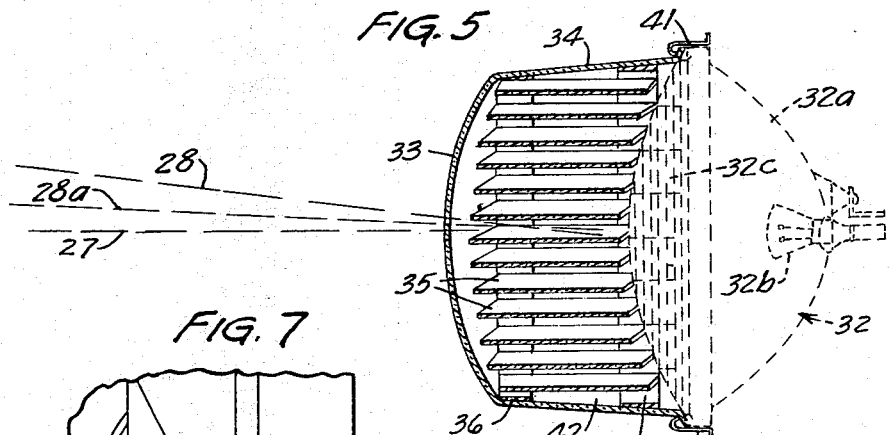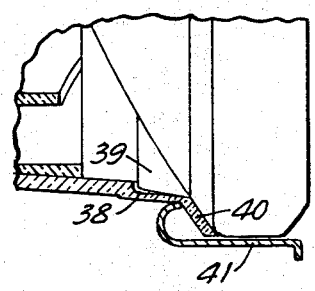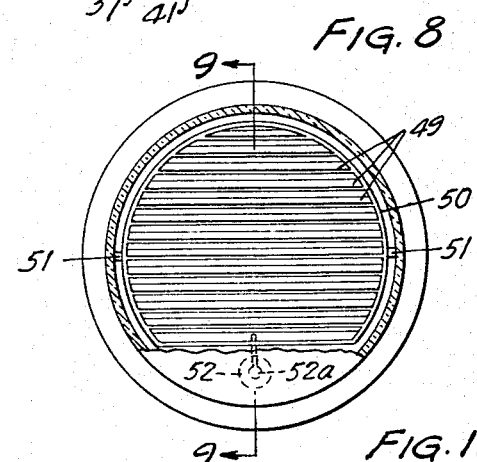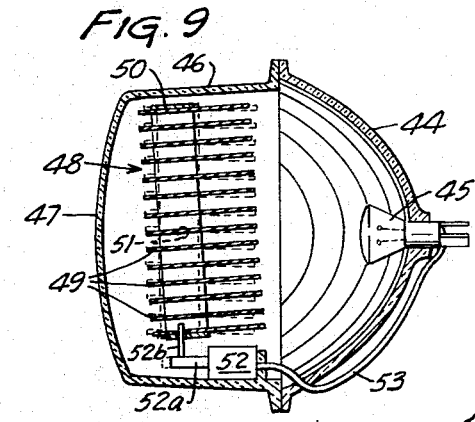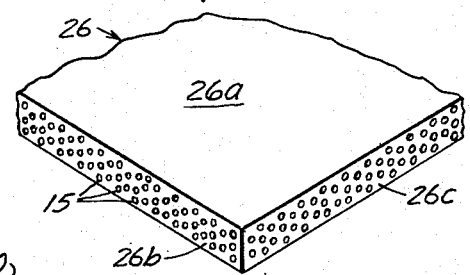

3,275,820
ILLUMINATING SYSTEM
Joseph M. Szarkowski, Box 124, Buchanan, N. Dak.
Filed Dec. 26, 1963, Ser. No. 333,585
4 Claims. (Cl. 240—46.31)

This application is a continuation-in-part of my copending application, Serial No. 771,497, filed Nov. 3, 1958, now abandoned.

This invention relates to illuminating devices and in particular to methods and means for reducing dazzle and glare thereof and modifying the colors emanating from said devices.

The invention is applicable to illuminating devices in general, and is particularly useful as applied to vehicle headlights, the application to which will be described in more detail hereinafter for illustrative purposes, it being understood however that the scope of the invention is not necessarily limited thereto and includes other illuminating devices such as search lights, rear illuminating lights, back-up lights, fog lights, farm tractor lights and the like.

Headlight glare is not only objectionable and aggravating to oncoming motorists and pedestrians, but, what is more important, is hazardous particularly to oncoming motorists who are blinded thereby and are caused to lose sight of the road and control of their cars, often times resulting in accidents. When driving, the eyes become adapted to the brightness of the field illuminated by the headlights, most dominant of which is the road surface in the foreground which changes with lighter and darker colored surfaces. When meeting another car having conventional type headlights, the situation drastically changes. The effective brightness of the opposing glare, even with low beams, is so much greater than the road brightness to which the eyes have become adapted that the the optical sensitivity of the eyes drops way down. In normal vision, eye sensitivity goes down only when the field brightness increases. In this instance, however, the brightness of the field ahead, as illuminated by the driver's own headlights, is not increased to compensate for the drop in eye sensitivity from the glare. In fact, it is required that drivers tilt down their beams or switch them to low beam and take away light from the longer ranges, instead of increasing it. Thus, the reduction in visibility is materially reduced and compounded by the combination of the reduction in eye sensitivity and the decrease in the distance of illumination and, therefore, visibility becomes extinct at the longer ranges. The effect is that just at the critical time when cars meet and pass each other, both drivers must blindly enter head-on into a zone of darkness. Even at modest speeds, both are temporarily incapacitated and it is this situation which is the crux of night highway visibility problems, and one of the primary causes of accidents.

Thus, present conventional headlights which require shifting from high beam to low beam while passing reduce the range of illumination and visibility distance just at the time when vision is being impaired by dazzle and glare from the approaching vehicle headlights and requires continued or increased illumination to compensate for such impairment. Also, the shifting from high beam to low beam while passing results in a range of illumination which is not equal to stopping distance and therefore increases the hazard if the driver is approaching another vehicle or obstacle which he cannot pick up in his headlights in time while on low beam.

Because of the glare and dazzle from conventional headlights, even when on low beam, many motorists have resorted to using protective screening means such as tinted windshields and colored glasses and visors to reduce the glare from oncoming vehicles. However, the use of such devices compounds the problem, further reducing visibility at a time when it should be increased rather than decreased.

Also, the human eyes cannot adapt from open road illumination to passing illumination as rapidly as vehicles pass each other and vice-versa.

Other contributing factors to the hazards presented by conventional headlights are the fact that the ability to judge motion decreases 66% to 75% when illumination decreases, and at 60 m.p.h. a motorist can travel 90 feet during the time the eye blinks.

Also, when driving in fog, rain, snow or dust, the light spill from conventional headlights above headlight level reflects from the fog, rain, snow or dust and thereby materially impairs the vision of the motorist. This light spill above headlight level is also very aggravating and often times dangerous to a driver who is being followed closely at night, since it reflects from his rear vision mirror directly into his eyes and impairs his vision.

With conventional headlights, it is impossible to decrease or eliminate glare and at the same time maintain the desired intensity and range of illumination ahead of the vehicle since if illumination is increased as by switching to high beam, then the glare is increased and the only way that the glare can be reduced is to reduce the illumination by switching to low beam which results in the aforementioned inadequate intensity and range of illumination ahead of the vehicle. Thus, present day headlights which provide for high and low beam operation constitute a compromise which does not solve the aforementioned problems.

Generally speaking, glares can be classified as discomfort glare and disability glare. Glare coming from primary reflector reflection direct to the eyes and line of sight is classified as disability glare. Normal glares coming from headlamps even on low beam to eyes at normal lines of sight are classified as discomfort glare. Included in the discomfort glare is the brilliance coming from an open filament, refracted and focused light concentrated at portions of the lens and portions of high reflector reflection all of which are termed harsh glare. When this harsh glare is removed or filtered and spread over the entire surface of the lighting device uniformly, the discomfort glare is reduced to a point where it does not affect the eyes as harshly. In conventional headlights, the discomfort and disability glare is occasioned by the fact that the reflector and source of light and the light rays emanating therefrom are not screened or filtered from the view of the oncoming motorist. Conventional headlights also use prismatic lenses which also provide undesirable glare.

Generally, three kinds of light are emitted from a headlight. The first kind is the focused light from the reflector which is projected onto the roadway at a predetermined angle and in a predetermined pattern to provide the desired illumination ahead of the vehicle. The second kind is the non-reflected, unfocused light which comes directly from the filament to the lens, and which is scattered by prismatic lenses as unwanted light or glare. The third kind is the reflected, unfocused light from the reflector which is also scattered as unwanted light or glare by prismatic lenses. These last two kinds of light, together with the scattered glare from prismatic lenses and exposure of the reflector and filament or source of light to the eyes of the oncoming motorist, are the primary causes of impaired vision to oncoming motorists.

One important object of this invention is to provide methods and means for solving the aforementioned problems by eliminating undesirable dazzle and glare.

Another object is to provide methods and means for eliminating undesirable dazzle and glare while maintaining the headlight on a high beam capable of illuminating the field ahead of the vehicle a distance equal to the stopping distance thereof.

Another object is to provide filtered shielding of dazzle and glare producing sources such as direct filament glare, secondary contrast glare and primary refractured regular reflection glare without materially interfering with the focused or wanted light beam intensity and direction.

Still another object is to provide for continued high beam operation while passing which is equal to vehicle stopping distance while at the same time providing means for simulating a lighted device which has specific uniform brilliance and color for indicating the position of the vehicle on the roadway but which is not harsh on the optical sensitivity of the eyes.

Another object is to provide a headlight which will not reflect the light of an oncoming vehicle to an extent sufficient to cause any impairment of vision of the oncoming motorist.

Still another object is to provide methods and means for eliminating undesirable glare and dazzle in headlights, which methods and means can be applied to original headlight equipment or which can be used as an attachment to conventional headlights such as the well known seal beam headlights now in common use.

Still another object is to provide means for eliminating undesirable dazzle and glare while simultaneously utilizing the sources thereof for a useful purpose by using same as a means for illuminating a medium which identifies and locates the position of the vehicle.

Still another object is to provide an illuminating device such as a headlight with a predetermined color exhibiting luminescent and multi-passage filtering medium having a plurality of spaced filtering members disposed forwardly of the source of light through which prefocused or projected light beams are projected on the roadway without substantially any interference from said filtering medium.

Still another object is to provide an illuminating device such as a headlight with a filter of predetermined color in which other colors and high illumination intensities of the unfocused and unprojected observed and exhibited light are filtered and reduced by density from light of sight or from view of the observer, thereby reducing the ratio of contrast between open road contrast and viewed lighting devices even with continued use of high beam of headlights to a level below that of presently used low beam to provide greater illumination of the pathway for aid to the eyes instead of impairment by dazzle.

Another object is to provide antiglare or antidazzle means which are readily adaptable to both one and two filament headlights including the single beam filament headlights of the four headlight systems.

A further object is to provide a headlight having an abnormally protruding lens and transparent housing and the aforementioned antidazzle means for eliminating glare when viewed from in front, so as to be readily visible to cars approaching from the side such as at side streets and cross roads and which permits projected beams to pass to the sides thereof to better illuminate the sides of the road and any signs located on the sides of the roadway.

Still another object is to provide a headlight with a reflector which projects focused light forwardly in horizontally flattened laterally spread vertically collimating beams for long range illumination and which projects beams laterally and downwardly from the periphery thereof for better illumination closer to the vehicle and for better illumination of the sides of the road, combined with a multi-passage filtering medium which permits unobstructed passage of the focused beams while shielding the reflector and source of light from view above headlight level, the filtering medium being illuminated by unfocused light rays sufficiently to serve as a means for locating the position of the headlight and vehicle to oncoming motorists while eliminating undesirable dazzle and glare.

These and other objects and advantages of this invention will more fully appear from the following description made in connection with the accompanying drawings wherein like reference characters refer to the same or similar parts throughout the several views, and in which:

FIG. 5 is a vertical longitudinal sectional view of a modified form of this invention as applied to a conventional seal beam headlight;

FIG. 7 is an enlarged fragmentary vertical sectional view taken approximately on the line 7—7 of FIG. 6;

FIG. 8 is a front elevational view of another embodiment of this invention;

FIG. 9 is a vertical longitudinal sectional view taken on the line 9—9 of FIG. 8;

FIG. 10 is a diagrammatic view of an electrical circuit for operating the form of invention shown in FIGS. 8 and 9;

FIG. 11 is a perspective view of a vehicle back-up light embodying one form of this invention; and FIG. 12 is an enlarged fragmentary perspective view of a portion of a louver of this invention.

Figure 1:
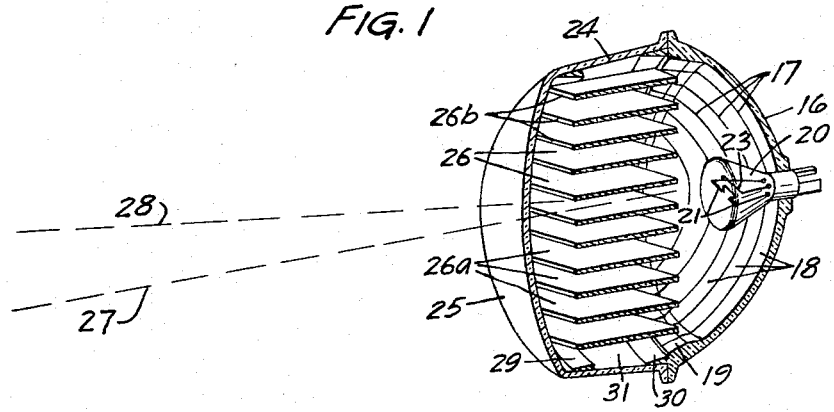
FIG. 1 is a perspective view of a vehicle headlight embodying this invention with portions thereof broken away for clarity.

Referring to the drawings and in particular to the headlight shown in FIG. 1, the headlight shown includes a dome-like reflector 16. This reflector is preferably a non-concentric parabolic hyperbolically planed reflector which has the ability of projecting focused downwardly and forwardly inclined vertically collimating horizontally flattended laterally spread beams in a substantially concentrated flattened area across the width of the road with a normally high intensity center for long range illumination. None of these focused beams are projected above headlight level. The inner reflecting face of the reflector 16 is parabolically shaped and provided with a series of transversely spaced vertically parallel hyperbolically curved crimps 17 which define therebetween non-concentric vertically parallel and hyperbolically curved flat contiguous light reflecting surfaces or planes 18 which provide the aforementioned focused long range illuminating beams. The ends of the planes 18 are separately inclined or offset as at 19 at the periphery or marginal edge of the reflector to project independent beams for illumination of road signs on the side of the road and for illuminating areas below and to the sides of the main beams provided by the surfaces 18.

Said reflector may be formed of any suitable material in any suitable manner. The reflector is preferably formed so that the crimps 17 are sharp and abrupt and the edges of the planes 18 contiguous to prevent small radiuses at the crimps which cause stray glares. One preferred method of this invention of accomplishing same is to form the reflector of moldable material such as glass, soft metal or plastic by congealing the material to the exact shape of the mold.

The reflector has enclosed therewithin a prefocused source of light such as a light bulb or lamp 20. In the illustrated embodiment, bulb 20 includes a prefocused filament 21 for projecting beams at a long range and a filament center portion 22 positioned above the focal point for projecting a second set of beams at closer range than that provided by the main filament 21. A second or low beam filament 23 is also provided which is positioned closer to the focal point of the reflector than customary conventional low beam filaments for lowering beams when necessary and for being less obstructed by louvers 26 hereinafter to be described. The low beam of the headlights of this invention is not lowered as much as the low beam of conventional headlights, and need not be because of the louver system hereinafter described. Thus, the low beam of the headlight of this invention provides greater visibility than the low beam of conventional headlights.

Figure 2:
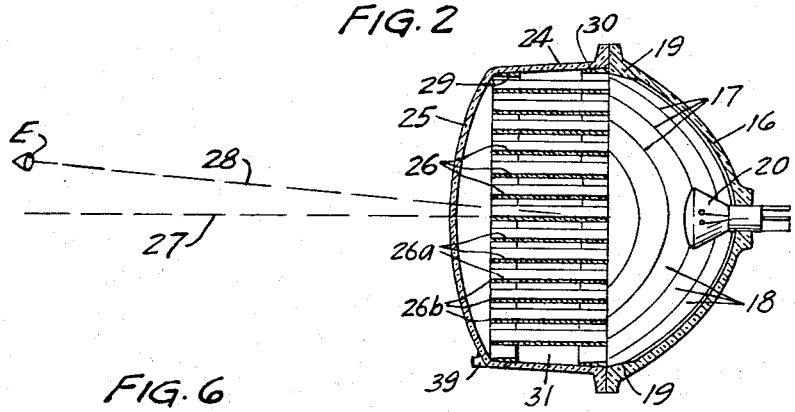
FIG. 2 is a vertical center section of the headlight of FIG. 1.

The filament and reflector are arranged so that the main focused light beams (high beam) are normally directed and inclined downwardly and forwardly from the horizontal at an angle up to 2 degrees for headlights of the type shown in FIGS. 1 and 2, and 2 or more degrees for headlights of the type shown in FIG. 9. The desired degree of downward inclination of the beams is achieved by mounting the entire headlight assembly on the vehicle so that the entire assembly is inclined downwardly at the angle desired for the beams.

An annular transparent housing 24 is attached to the front of the reflector by any suitable means, the forward end of said housing being closed by a circular outwardly domed or convexed non-prismatic non-beam spreading transparent lens 25 of substantially uniform thickness. The housing 24 is transparent for the purpose of permitting the laterally spread beams from the reflector to be projected through the sides of the headlight to better illuminate the sides of the roadway to simulate a lighted device and make it readily visible to those approaching from the side, and to expose to view the enclosed self-illuminated and external reflex reflecting luminescent filtering medium hereinafter to be described. In the illustrated embodiment, the housing 24 is substantially frustro-conical to facilitate the formation thereof in a mold with the largest portion thereof facing rearwardly. However, it will be understood that other housing shapes are within the scope of this invention.

The vertical hyperbolic planes 18 of the reflector in conjunction with filaments 21, cause the light beams to be focused forwardly and spread on and across the width of the roadway from left to right through lens 25 and housing 24 in a predetermined pattern for long range illumination, which long range illumination is aided by the use of the non-prismatic, non-beam spreading lens 25 which is less light absorbing than the conventional prismatic beam spreading lenses now used.

Positioned within the transparent housing 24 between the bulb 20 and the lens 24 is a filtering and shielding medium which consists of a plurality of elongate vertically spaced stationary self and externally illuminated light and color shielding and filtering luminescent louvers 26. The louvers extend transversely of the housing 24, preferably from one side thereof to the other, and are positioned in non-obstructing relationship to the normally used focused beams 27 from the filaments 21 and 22 projected forwardly by the surfaces 18 whereby the beams 27 pass between the louvers without interference therefrom. The louvers are also preferably in non-obstructing relationship to the focused beams from low beam filament 23 which is accomplished by positioning said filament closer to the focal point than conventional low beam filaments as hereinbefore described. The combined vertical series of louvers span substantially the entire vertical height of the housing 24 and are so arranged as to completely shield the bulb and the entire reflective surface of the reflector from direct view when the headlight is viewed from in front or from the sides above headlight level, as is the case with oncoming motorists when vehicles pass each other. Thus, all light rays directed upwardly above headlight level (which rays are usually the unreflected unfocused rays from the bulb and the reflected unfocused rays from the reflector) are intercepted by the louvers to prevent uncontrolled light ray spill above headlight level and thereby eliminate undesirable glare and dazzle. The accompanying drawings illustrate one preferred louver arrangement for accomplishing the aforementioned shielding of unfocused rays from normal line of sight while permitting the focused beams to pass unobstructed from the reflector to the roadway.

Figure 6:
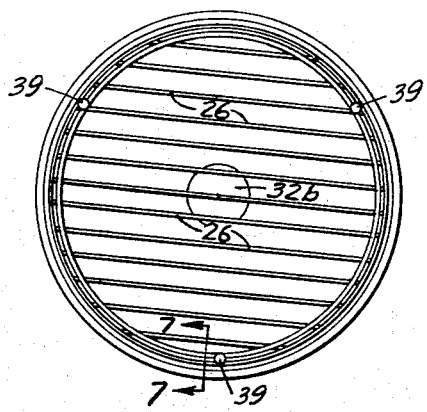
FIG. 6 is a front elevational view thereof.
Figure 3:
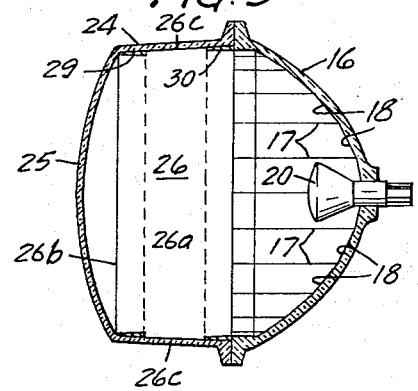
FIG. 3 is a horizontal center section view of the headlight of FIG. 1.
Figure 4:
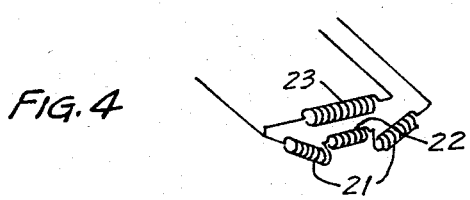
FIG. 4 is an enlarged perspective view of the filament arrangement of FIG. 1.

In the illustrated embodiment, the louvers are in substantially parallel relationship to each other and to the focused beams 27, with the louvers being inclined forwardly and downwardly at substantially the same angle as the beams 27 when the entire headlight assembly is mounted on the vehicle. The longitudinal axes of the louvers may lie in horizontal planes, as in the headlight of FIGS. 8 and 9, but they are preferably inclined slightly from the horizontal as in the forms of the invention illustrated in FIGS. 1 and 5 and as clearly shown in FIG. 6. The louver assembly is preferably rotated clockwise (as viewed from in front as in FIG. 6) whereby the louvers are longitudinally inclined approximately 5–10 degrees from the horizontal, so that the louvers are inclined and face slightly to the right side. This increases the shielding effect for both front and side viewing of the headlight and provides complete shielding at a lower level of line of sight on the oncoming motorist's side without changing the spacing or length of the louvers. When the louvers are rotated clockwise as shown in FIG. 6 so as to be inclined to the right side, the reflector normally will be maintained with its crimps 17 and planes 18 in their normal vertical position. However, in some circumstances it may be desirable to rotate the reflector clockwise one or two degrees to slightly raise the light on the right side and slightly lower it on the left side.

The aforementioned shielding effect of the louvers is diagrammatically illustrated in FIGS. 1 and 2. "E" represents the eyes of an oncoming motorist with dotted line 28 representing the downwardly inclined line of sight of the oncoming motorist as he views the headlight from the front thereof, said line of sight normally originating from above the headlight. It can be seen from this illustration that the louvers are interposed in the path of the line of sight of the oncoming motorist between the eyes of the motorist and the reflector and bulb so that the latter are completely shielded from direct view by the eyes of the oncoming motorist by these louvers during the entire time that the vehicles are passing. The substantially parallel relationship of the louvers and the focused light beams enables the focused light beams to pass to the roadway ahead of the vehicle without any interference or obstruction from said louvers.

Thus, it can be readily seen that the louver assembly entirely shields the reflector, light source and the unfocused light rays and glares therefrom from the sight of the approaching motorist. In a four headlight system, the positioning of a portion of the filament above the focal point can be used with this system if desired. However, it is not necessary when using the four headlights at one time.

The louvers may be mounted in the housing and held in their respective positions by any suitable means. In the illustrated embodiment, the louvers are mounted and held by retaining rings 29 and 30 which are laterally or axially spaced from each other to provide an unobstructed space, area or portion 31 about the periphery of housing 24 through which light beams are projected laterally through the sides of the housing to the sides of the road and projected downwardly through the housing immediately in front of the vehicle. The retaining rings are interposed between the housing and the ends of the louvers and attached to both.

In the illustrated embodiment, the rings 29 and 30 are integrally molded with the louvers 26. The ring 29 is of smaller diameter than ring 30 and the sides 26c of the louvers are tapered so that when molded, the entire louver and ring assembly may be easily withdrawn from the mold and then conform to the inner surface of the tapered transparent housing.

In the most preferred form of this invention, the louvers are translucent so as to filter and pass only a portion of the unfocused light from the bulb and reflector, but permitting the passage of a portion of the light therefrom therethrough so that the louvers will be illuminated and exhibit light so that the louvers and the entire headlight (except the reflector and bulb) can be seen by an oncoming motorist, with the light being softened and filtered by its passage through the louvers sufficiently so that it will not cause any discomforting or disabling brilliance to the eye of the oncoming motorist. The term "translucent" as used herein means that the louvers filter out a portion of the light rays projected thereagainst and reduce the total amount of light transmitted therethrough so that only a portion of the unfocused light from the bulb and reflector are passed therethrough and includes the passage of diffused light such that objects cannot be clearly distinguished on the other side of the louvers and also includes a louver through which objects on the other side thereof can be seen but which is provided with a coloring or filtering medium which filters, subdues and reduces the total amount of light passed therethrough.

The louvers may be formed of any material and in any manner which will provide the desired shape and translucency. However, they are preferably made of dimensionally stable plastic material in rigid metal molds. Where the type of plastic does not permit ready removal of the inner mold, a combination of rigid mold for the housing and a semi-rigid or elastic mold for the louvers can be used. The preferred plastic materials are hardenable synthetic resins such as polystyrene, polyester, acrylic and methylmethaerylate known as Lucite. To attain the filtering and color effect desired, dye (which may be transparent) may be intimately mixed with the plastic material. If the plastic material with or without a dye incorporated therewith is incapable of providing the degree of luminescence desired for the louvers, luminescent means may also be combined or intimately mixed with the plastic material, such as a small amount of light reflecting particles formed of such material as lead or zinc carbonates, ammonium phosphates of manganese, zinc beryllium silicate, other organic and inorganic light-reflecting material for obtaining artificial electric luminescence, or glass beads. The desired degree of translucency may also be attained by coating the surfaces of preformed louvers with any suitable light filtering means. The top surfaces of the louvers may be provided with translucent particles to make said surfaces rough and irregular to increase the non-reflectivity thereof while providing the desired amount of exhibited light to the viewer. Light reflecting means may be incorporated in or added to the louvers to provide a desired amount of illumination or luminescence for the louvers during use. However, said means are so designed and arranged that they will not cause any undesirable dazzle or glare to the viewer.

Regardless of how formed, the translucent louvers are designed to substantially reduce but not completely eliminate the amount of light exposed to view above headlight level so that modulated light will be exhibited by the louvers, said louvers being preferably designed to reduce the amount of light exposed to view by approximately 75%.

The top surfaces 26a of the louvers are preferably non-reflective so that they will not reflect the light from an oncoming vehicle or unfocused beams from the reflector and thereby cause objectionable glare to reflect therefrom into the eyes of the oncoming motorist.

As a safety precaution, when the headlights are inoperative, the front edges 26b and the side edges 26c of the louvers are provided with any luminous light reflecting means such as glass beads 15 (as shown in FIG. 12) which will readily reflect the light of an oncoming vehicle and readily identify the position of the vehicle with the inoperative headlights to the driver of said oncoming vehicle. However, these light reflecting means are in such amount and so arranged that they will not cause any undesirable reflective glare or dazzle to the oncoming motorist when the headlight is operative or inoperative.

The louvers may be of any color which will produce the desired filtering and reduced luminescence. However, they are preferably white to amber for forward use and red for rear use to conform to established standards to enable the direction of movement of the vehicle to be readily ascertained. Colors such as green and blue may also be used for specific vehicles such as motorcycles and snowplows to indicate the type of vehicle that is approaching. On some types of vehicles this is now done by the use of clearance lights. Thus, by controlling the specific colors to be used on different parts of the vehicle and for specific types of vehicles, the type of vehicle and the direction of movement thereof can be readily ascertained by the viewer.

FIG. 5 is another form of this invention which is adapted for use with present conventional seal beam lamps 32, which includes a domed reflector 32a, a bulb 32b and prismatic lens 32c, and which is adapted to focus beams forwardly and downwardly on the roadway in a manner well known. This form of the invention has a transparent lens 33, transparent housing 34, louvers 35 (which are disposed in non-obstructing relationship to the focused high beams of seal beam lamp) and louver-retaining rings 36 and 37 which are of the same basic construction as the corresponding parts in the form of the invention shown in FIG. 1 and hereinbefore described. However, in this version, the housing 34 is provided with three indentations 38 on the inner surface thereof adjacent the rear marginal edge thereof for engagement and seating of the conventional aiming pads 39 of the conventional seal beam lamp 32 for facilitating attachment thereto. The rear marginal edge of the housing 34 is flared outwardly as at 40 to form a lip or flange which is engaged by an annular retaining clip 41 for mounting and holding the housing 34 on the seal beam lamp, the clip 41 also serving as the means for holding the seal beam lamp in place on the vehicle (not shown) in a manner well known. The clip 41 may be the conventional ring normally used to hold the seal beam in place on the vehicle. The transparent lenses 25 and 33 and the transparent housings 24 and 34 may be formed of any suitable material such as transparent plastic or glass, or a combination thereof. The attachment shown in FIG. 5 also provides an open space or portion 42 about the housing 34 between the louver-retaining rings 36 and 37 to permit laterally projected beams to pass through the housing 34 to illuminate the sides of the roadway and to permit closer range beams to be projected downwardly closer to the vehicle. The form of the invention shown in FIG. 2 may also be provided with one or more aiming pads if so desired to facilitate installation thereof. Broken line of sight 28a in FIG. 5 illustrates the increased shielding when the headlight is viewed from a position toward the left side by rotating the louver assembly clockwise about its axis.

Another form of this invention which is particularly adapted to two filaments (high and low beam) headlights is illustrated in FIGS. 8 and 9. The headlight of FIGS. 8 and 9 includes a dome-like reflector 44. Enclosed within the reflector 44 is a two filament bulb 45. An annular transparent housing 46 is mounted on and attached to the reflector 44, the front end of the housing 46 being closed by a non-prismatic lens 47.

A screen assembly 48 is tiltably mounted within the housing 46. This assembly includes a plurality of substantially horizontally disposed vertically spaced parallel louvers 49 which are mounted on an annular frame 50, the assembly 48 being pivotally or tiltably supported by means of pivot pins 51 carried by the annular frame 50 and pivotally supported by the housing 46. The entire screen assembly is adapted for tilting movement about the horizontal axis provided by pivot pins 51 and is designed to come to rest at two different predetermined positions, one for high beam and the other for low beam operation, so that the angle of the louvers may be altered to conform to the angle of the light beams so as to be substantially parallel thereto at all times. The pivot pins 51 are attached forwardly of the center of gravity of the screen assembly so that the screen tilts or moves naturally in a clockwise direction (as viewed in FIG. 9) about the pins 51 in the form shown and is adapted to come to rest naturally so that the louvers are substantially parallel to the light rays when the headlight is on high beam operation as shown by the broken line position of FIG. 9. For low beam operation, the louvers are moved counterclockwise (as viewed in FIG. 9) and thereby inclined downwardly and maintained in that position shown by the solid line position of FIG. 9 by means of a solenoid 52 which is electrically in series with wire 53 which is connected with the low beam filament of bulb 45. The reciprocable armature or plunger 52a of the solenoid is retracted by energization of the solenoid when the headlight is switched to low beam. The plunger is provided with an upstanding arm 52b which is adapted to engage the lower portion of the screen assembly and pull it rearwardly and thereby tilt it into and hold it in low beam position when the plunger is retracted. When headlight operation is switched from low to high beam, the current passing through the solenoid is shut off, the solenoid ceases to operate and the louver assembly is released by the solenoid and returns of its own weight an off-center pivotal connection to its high beam position. If desired, biasing means may be provided for positively returning the screen assembly to high beam position after its release by the solenoid.

FIG. 10 diagrammatically illustrates a suggested electrical circuit for operating the headlight and antiglare screen shown in FIGS. 8 and 9. The lamp or bulb 45 has a low beam filament 54 and a high beam filament 55 which is energized by dimming switch 56 and battery 57. When the bulb 45 is put into low beam operation by dimming switch 56, the current is directed to coils 58 of the two coil solenoid which lights the low beam filament and holds the louver assembly in low beam position until the switch is shifted into high beam or the lights are turned off.

During the first moment when the dimming switch is turned to low beam, part of the current is sent through the second coil 59 of the solenoid to help move the louver assembly into low beam position. However, this current is cut off by switch 60 just before the solenoid reaches the ends of its travel by stopping on the solenoid and from then on the coil 58 holds the solenoid in position. The same current that holds coil 58 in operation operates filament 54 simultaneously.

FIG. 11 illustrates a vehicle back-up light embodying this invention. The back-up light includes a protruding frustro-conical lens 61 mounted forwardly of a source of light (not shown). The lower downwardly facing portion 62 of the lens is clear and transparent to permit light to be projected downwardly therethrough without interference or obstruction therefrom. The upper portion 63 and the outer face 64 of the lens are coated with any suitable translucent filtering means, preferably red in color for shielding the source of light from view along normal lines of sight.

From the foregoing description, the advantages of this invention are readily apparent. The normally full shielding translucent luminescent filtering medium in cooperation with the dual beam light source and multi-beam directing reflector provides full illumination together with continued long range illumination while passing which does not affect the eyes adversely and at the same time restrains light ray spill above headlamp level which when driving in fog, rains, dust or snow storms would cause glare and reduced visibility for the driver by reflections from the fog, rain, dust or snow. The reduction in glare is particularly advantageous to the approaching motorist who is not blinded by any glare and also is advantageous to motorists being followed since it prevents harsh glare above headlight level from being reflected from the rear vision mirror of the motorist being followed.

The non-reflective top surfaces of the louvers prevent reflection therefrom of glare creating rays, from both the headlights of the oncoming vehicle and from the stray unfocused rays of the reflector itself. The louvers also filter and modulate the unfocused light from the filament and reflector and present an illuminated surface to the viewer which is not harsh to the eyes for added illumination ahead of the vehicle and for identifying the position of the vehicle. The light reflecting means on the front and side edges of the louvers enable the vehicle to be located when the headlights are inoperative. The protruding lens enables the headlight and vehicle to be readily seen and located by those approaching from the side of the vehicle. The headlight of this invention also provides for increased illumination both forwardly and laterally of the vehicle while completely eliminating undesirable dazzle and glare.

This invention contemplates the use of any source of light with a filtering medium whether said source of light be focused, refractured or unfocused, in which the filtering medium is so constructed as to allow the source of light to illuminate the pathway without substantially any obstruction, but is so positioned between the observer and source of light whereby the observer will view the source of light only through the filtering medium. The filtering medium can have a plurality of spaced members or louvers for headlight use such as hereinbefore described, or may consist of a single member for small diameter lights such as back-up lights and may consist for example of a lower transparent lens for directing the light downwardly and in which the upper portion is provided with a filtering medium whereby the source of light can be seen from above by an observer only through the filtering medium.

Although the louvers in the most preferred form of this invention are translucent as hereinbefore described, the invention includes within its scope the use of opaque louvers or other opaque shielding means which eliminate glare and dazzle while permitting unobstructed passage of focused light beams unto the roadway.

Because the driver of a vehicle equipped with the novel no-dazzle and no-glare headlights of this invention is likely to encounter oncoming vehicles not so equipped which still use the conventional glare and dazzle producing headlights, the vehicle having the headlights of this invention should also carry the glare reducing protective screening means hereinbefore referred to to protect the driver thereof from the glare of the headlights of said oncoming vehicle. The protective screening means may take any form and be of any suitable material capable of accomplishing the intended purpose. The aforementioned protective screening means have no value when used by drivers of vehicles equipped with conventional glare and dazzle producing headlights, since the conventional headlights must be dimmed while passing, thereby adding to the reduced visibility caused by the screening means rather than compensating therefore. However, the increased illumination provided by the headlight of this invention while passing compensates for the visibility taken away by the screening means and makes the use of same practical by the drivers of vehicles equipped with my headlight.

Tests have shown that partial shielding of the reflector and light source from the eyes of the viewer does not accomplish the desired elimination of dangerous and discomforting dazzle and glare. Thus, the vision of oncoming motorists is still impaired by the dazzle and glare of conventional seal beam headlights, the upper half of which is covered with opaque material. Therefore, substantially all of the glare producing sources should be shielded from view in order that the vision of the viewer will not be impaired. The density and wave lengths of the light filtering louvers may be controlled and regulated by the amount of transparent dye or translucent particles intermixed therewith in order to provide the degree of exhibiting luminescence desired which will provide alequate illumination without impairment of vision.

The filtering system of this invention enables light of maximum intensity to be projected upon the roadway to adequately illuminate the pathway of the vehicle while passing and controls and filters all light above headlight level so that no vision impairing dazzle or glare is exhibited, only modulated filtered light which is exhibited by the filtering system to a degree sufficient to make the headlights and vehicle readily identifiable, but without causing discomfort or impairment of vision to the viewer.

Regarding the exhibition of specific colors for specific vehicles and at specific locations thereon, my filtering system enables specific colors to be exhibited without requiring any increase in wattage or candle power to attain the degree of illumination desired. Thus, if the lenses of conventional headlights were colored blue, the darker color would absorb light to an extent that wattage would have to be increased in order to get the same illumination as with an uncolored lens. Such is not the case in the system of this invention since the filtering means can exhibit any color desired without absorbing or interfering with the focused beams which pass unobstructed to the roadway. The different colors provided by my filter provide the means for preventing the exhibition of other colors, which other systems cannot. Conventional back-up lights and rear illuminating lights do not have the means of preventing the exhibition of other than red on the rear of vehicles.

It will, of course, be understood that various changes may be made in the form, details, arrangement and proportions of the various parts without departing from the scope of my invention.

What I claim is:

1. In combination, a seal beam lamp having an outwardly curved circular prismatic lens with aiming pads thereon, lamp retaining ring adapted to engage the outer edge of said lamp and support said lamp on a vehicle, an annular transparent housing mounted in front of said lamp, a transparent non-prismatic lens closing the front of said housing, a vertical series of parallel vertically spaced downwardly and forwardly inclined translucent louvers mounted in said housing transversely thereof and transversely inclined slightly from the horizontal, said series of louvers spanning substantially the entire vertical expanse of said housing, a pair of axially spaced louver retaining rings connected to said housing and louvers for holding said louvers in operative position within said housing, said housing having a radially outwardly flared flange formed on the rear edge thereof adapted to be inserted between said lamp retaining ring and said lamp for securing said housing to said lamp, said housing having indentations formed on the inner surface thereof adjacent the rear edge thereof for receiving and seating said aiming pads therein, the top surfaces of said louvers being substantially nonreflective, the forward edges of said louvers being provided with light reflecting means.

2. In combination, a sealed beam lamp having an outwardly curved circular prismatic lens with aiming pads thereon, a lamp retaining ring adapted to engage the outer edge of said lamp and support said lamp on a vehicle, an annular housing mounted in front of said lamp, a transparent lens closing the front of said housing, a series of parallel downwardly and forwardly inclined translucent louvers in said housing permitting light transmission therebetween, said louvers being oriented generally horizontally and spanning substantially the entire vertical expanse of said housing, a louver retaining ring affixed to each of the louvers and maintaining the louvers in said housing in operative position within said housing, said housing having means affixing the rear edges of said housing in secure relation with said lamp retaining ring and maintaining a prefixed relation to the lamp, said housing having indentations formed on the inner surface thereof adjacent the rear edge for receiving and seating said aiming pads whereby to locate the housing and louvers in relation to the lamp.

3. The invention according to claim 2 wherein said louvers lie substantially parallel to a diameter of said annular housing and extend at an acute angle to the horizontal whereby to direct the light from said lamp away from an oncoming vehicle.

4. The invention according to claim 2 wherein said louvers have a substantially non-reflective top surface and wherein said louvers have a light reflecting forward edge.

References Cited by the Examiner

UNITED STATES PATENTS

| | | | |
|---|---|---|---|
| 1,441,374 | 1/1923 | Roberts | 240—46.59 X |
| 1,536,146 | 5/1925 | Saffert | 240—46.59 X |
| 1,585,852 | 5/1926 | Gowdy | 240—41.36 |
| 1,591,754 | 7/1926 | Gates | 240—46.07 |
| 2,012,933 | 8/1935 | Davidson. | |
| 2,433,503 | 12/1947 | Young | 240—9.5 X |
| 2,701,298 | 2/1955 | Michailovsky | 240—46.31 |
| 2,831,966 | 4/1958 | Porteous | 240—1.1 |

FOREIGN PATENTS

| | | |
|---|---|---|
| 1,191,658 | 4/1959 | France. |
| 458,239 | 7/1950 | Italy. |

NORTON ANSHER, *Primary Examiner.*

CHARLES R. RHODES, *Assistant Examiner.*